United States Patent Office

2,855,726
Patented Oct. 14, 1958

2,855,726

PROCESS FOR EXTENDING FLOWER LIFE

Leonard Harlan Weinstein, Yonkers, N. Y., assignor to Boyce Thompson Institute for Plant Research, Inc., a corporation of New York No Drawing. Application July 29, 1957
Serial No. 674,559

3 Claims. (Cl. 47—58)

This invention relates to the preservation of cut flowers, and particularly to extend their vase life or freshness. The invention provides a treatment process for extending the freshness and color of cut pink and red roses, and a composition of chemicals for this purpose.

Heretofore, many substances including salts of maleic acid hydrazide have been added to the water in which cut flowers are kept to extend their vase life. Water solutions of salts of maleic acid hydrazide are effective for extending the freshness of cut flowers but they are not suitable for use in the treatment of pink and red roses because the roses turn blue.

This invention is based on my discovery that cut roses, the stems and leaves of which have been immersed into a water solution of a salt of maleic acid hydrazide, and then into a water solution of a salt of a strong acid and a chelating agent, will have a much longer state of freshness than that resulting from immersing the stems in a water solution of a salt of maleic acid hydrazide, but without turning the roses blue. A preferred salt is one formed of a metal of the group consisting of aluminum, cobalt or manganese, and a strong acid, such as sulfuric acid or hydrochloric acid.

In accordance with the process of the invention the rose stems and leaves are initially immersed into the aqueous solution of a salt of maleic acid hydrazide, preferably including a wetting agent, to absorb this compound into the rose. This treatment is preferably done shortly after cutting the roses. Then the stems of the roses are immersed in the solution containing the salt of a strong acid and the chelating agent and are left in this solution during the usual "hardening-off" and storage at low temperatures of about 40° F. It appears that the chelating agent reacts with the salt of the strong acid forming sulfuric acid or hydrochloric acid, as the case may be, and lowering the pH to the effective range which is below 4.0. Suitable preferred chelating agents which have been found to be effective are those which prevent precipitation of the metal of the salt and give the required pH, such as the polycarboxylic acids, and the aminopolycarboxylic acids, and their alkali metal salts. Specific preferred compounds are citric acid, ethylenediaminetetracetic acid, N-hydroxyethyl-ethylenediaminetriacetic acid, and diethylenetriaminepentaacetic acid, and their alkali metal salts.

The penetration of the salt of maleic acid hydrazide into the rose and its travel into the bud is increased by including in the solution thereof a suitable wetting agent, such as Dreft, Triton X–155 or Triton X–114.

The second treating solution containing salt of a strong acid such as $Al_2(SO_4)_3 \cdot 18H_2O$, and a chelating agent such as citric acid can be made more effective by including some alum (potassium aluminum sulfate), which improves the crispness of the roses, and a sugar such as sucrose or glucose which supplies nutrient to the roses.

By treating the freshly cut roses in the bud state, according to the invention, the freshness of the opened or partially opened bloom is preserved from 1 to 3 days longer than roses treated by present practices.

My invention provides a composition for preserving cut pink and red roses consisting of two parts for forming separate aqueous solutions for treating the roses as aforementioned.

The composition of my invention may be prepared for use by the consumer as a solid, or as a solution, comprising the required proportions of the chemicals, and units of the composition may be added to measured quantities of water to form a solution of the proper concentration for immersing the stems of the roses in carrying out a process of the invention.

The following are examples of preferred compositions of my invention:

The part of the composition for forming the first treating solution consists of a water-soluble salt of maleic acid hydrazide such as the salt formed by reacting diethanolamine with the maleic acid hydrazide, and a wetting agent. Although diethanolamine is the preferred amine for forming the salt, I may use monoethanolamine, morpholine or tris (hydroxymethyl) aminomethane. This part of the composition can be used to form solutions in water containing from 5,000 to 20,000 p. p. m. of maleic acid hydrazide as an amine salt, and about 0.0125% of wetting agent, the amount of wetting agent, of course, not being critical. Instead of using the salt of maleic acid hydrazide, I may use a mixture of about equal parts of the acid and diethanolamine to form the amine salt in solution.

The part of the composition for forming the second treating solution comprises from 0.1% to 0.5% by weight of an acid salt of aluminum, cobalt or manganese.

The chelating agent should be used in an amount varying from 0.1% to 0.5% by weight.

An example of an effective second solution is one comprising 0.618 gram of $Al_2(SO_4)_3 \cdot 18H_2O$, 1.0 gram of citric acid or 1.7 grams of sodium ethylenediaminetetracetic acid dihydrate, in 1000 mls. of water. The chelating agent and acid salt are preferably used in such proportions that the water solution thereof has a pH below 4.0. In addition to the aforementioned components of the second port of the composition, I may add from 0.005% to 0.02% of alum (potassium aluminum sulfate) and from 0.5% to 3.0% of sugar in the form of sucrose or glucose to provide in the solution from 50 to 200 p. p. m. of alum and 5,000 to 30,000 p. p. m. of sugar. Roses of the type that are most effectively treated according to the invention are known as Better Times and Briarcliff.

In the treatment of roses by the grower according to the process of the invention, the rose buds are cut and as soon as possible, the stems and leaves are immersed into the first solution which consists of a water solution of the salt of maleic acid hydrazide long enough to wet the stems and leaves. This solution acts on the principle of growth inhibition to prolong the development of the buds and extend the vase life of the flowers. The rose buds open slower, and attain a final form and shape superior to that of the untreated roses kept in water alone.

The stems of the roses are then placed in the second solution and while in this solution they are hardened-off by putting them in a refrigerator for from 6 to 36 hours at the usual low temperature of about 40° F. The roses are then removed from the solution and shipped in the usual manner to the wholesaler, retailer or consumer. The roses treated by my process last from 1 to 3 days longer than roses treated with water, and they have excellent color and crispness.

My co-pending patent application Serial No. 556,079, filed December 29, 1955, discloses and claims a single composition and treating solution consisting of the same chemicals.

The following table illustrates the preservation of Better Times roses which were cut in the bud stage. One group of roses were immersed in water for comparison with another group of roses that were immersed successively in the two solutions of the invention.

| Treatment | #1 | | #2 | | #3 | | #4 | | #5 | | #6 | |
|---|---|---|---|---|---|---|---|---|---|---|---|---|
| | Stage | Color | Stage | Color | Stage | Color | Stage | Color | Stage | Color | Stage | Color |
| Water | 5 | + | 5 | + | 5 | + | 6 | ---- | 6 | ---- | 6 | ---- |
| MH 10,000, dip then into Al 100, Citric 800 | 1 | ++++ | 2 | ++++ | 2 | ++++ | 2 | ++++ | 3 | ++++ | 3 | ++++ |

| Treatment | #7 | | #8 | | #9 | | #10 | | #11 | |
|---|---|---|---|---|---|---|---|---|---|---|
| | Stage | Color | Stage | Color | Stage | Color | Stage | Color | Stage | Color |
| Water | 6 | ---- | 6 | ---- | 6 | ---- | 6 | ---- | 6 | ---- |
| MH 10,000, dip then into Al 100, Citric 800 | 3 | ++++ | 3 | ++++ | 4 | +++ | 4 | +++ | 4 | +++ |

Final stages of development (after 6 days):
1—tightly closed bud; 2—bud one-third open; 3—bud one-half opened; 4—bud three-fourths opened; 5—bud fully opened; 6—petals fallen off.
Color:
+ Severe blueing of petals; ++ moderate blueing of petals; +++ slight blueing of petals; ++++ no blueing of petals.
MH—maleic acid hydrazide (p. p. m.).
Al—Aluminum as $Al_2(SO_4)_3$—$18 H_2O$ (p. p. m.).
Citric—citric acid (p. p. m.).

I claim:

1. In the treatment of pink and red roses to extend their vase life and prevent them from turning blue, the improvement which comprises immersing the stems and the leaves of the freshly cut roses in a water solution comprising a water-soluble salt of maleic acid hydrazide, then immersing the stems of the roses in an aqueous solution of a salt of a strong acid and a polycarboxylic acid chelating agent, said last-mentioned solution having a pH below 4.0 resulting from the reaction of the metal salt of the strong acid and the chelating agent, and storing the roses while in said last mentioned solution in a refrigerator to harden-off the roses.

2. The process of claim 1 in which the chelating agent is a compound of the group consisting of citric, ethylenediaminetetraacetic acid, N-hydroxyethylethylene-diaminetriacetic acid, diethylenetriamine pentaacetic acid, and their alkali metal salts.

3. The process of claim 1 in which the second-mentioned salt is of an acid of the group consisting of sulfuric acid and hydrochloric acid and a metal of the group consisting of aluminum, cobalt and manganese.

No references cited.